United States Patent [19]

Tsukiyama et al.

[11] 4,336,696
[45] Jun. 29, 1982

[54] TRIPOD TYPE CONSTANT VELOCITY UNIVERSAL JOINT

[75] Inventors: Yoshifumi Tsukiyama, Okazaki; Yasunori Hatanaka, Toyota; Akiyoshi Ogawa, Nishikamo; Hitoshi Mizutani, Aichi, all of Japan

[73] Assignee: Toyota Jidosha Kogyo Kabushiki Kaisha, Toyota, Japan

[21] Appl. No.: 119,155

[22] Filed: Feb. 6, 1980

[30] Foreign Application Priority Data

Feb. 9, 1979 [JP] Japan .................................. 54-14804

[51] Int. Cl.$^3$ ............................................... F16D 3/30
[52] U.S. Cl. ..................................... 464/111; 464/904
[58] Field of Search ................................. 64/21, 7, 8

[56] References Cited

U.S. PATENT DOCUMENTS

| | | |
|---|---|---|
| 3,381,497 | 5/1968 | Allen ........................................ 64/21 |
| 3,792,598 | 2/1974 | Orain ........................................ 64/21 |
| 3,805,551 | 4/1974 | Mangiavacchi et al. ................. 64/21 |
| 3,990,267 | 11/1976 | Orain ........................................ 64/21 |
| 4,205,539 | 6/1980 | Orain ........................................ 64/8 |
| 4,255,945 | 3/1981 | Alexandre ................................ 64/21 |

FOREIGN PATENT DOCUMENTS

| | | |
|---|---|---|
| 2838234 | 3/1979 | Fed. Rep. of Germany ........... 64/21 |
| 2838235 | 3/1979 | Fed. Rep. of Germany ........... 64/21 |
| 2009887 | 6/1979 | United Kingdom ..................... 64/21 |

Primary Examiner—Charles J. Myhre
Assistant Examiner—Magdalen Moy
Attorney, Agent, or Firm—Stevens, Davis, Miller & Mosher

[57] ABSTRACT

A tripod type constant velocity universal joint for interconnecting two shafts to permit transmission of a driving force in a vehicle such as a motor car. In said tripod type constant velocity universal joint, a trunnion portion of the tripod shafts is urged against and supported by a tulip portion of a second shaft by a tripod spring, the spherical head of a mushroom-shaped member provided in the mounting hole of said trunnion portion is kept in contact with a recess in said tulip portion by the biasing force of a compression spring, and further, said mushroom-shaped member or said trunnion portion of the tripod shafts is formed to provide a spherically curved surface or a conical surface incorporating a straight line, in which the distance from the center of the joint is increased as a point on the external configuration leaves the center toward the outer periphery.

8 Claims, 7 Drawing Figures

TRIPOD TYPE CONSTANT VELOCITY UNIVERSAL JOINT

BACKGROUND OF THE INVENTION

1. Field of the Invention

This invention relates to a tripod type constant velocity universal joint for interconnecting two shafts to permit them to transmit a driving force in a vehicle such as a motor car.

2. Description of the Prior Art

In general, tripod type constant velocity universal joints are for use in transmitting the driving force in vehicles. In the conventional tripod type constant velocity universal joint, as shown in FIG. 1, solidly secured to one end of a first shaft 1 is an outer shell member 2, to the inner surface of which are arranged radially from the center of said first shaft 1 as driving force transmitting elements three tripod shafts 3, onto each of which a roller 4 is mounted rotatably and axially movably in the direction of each tripod shaft 3.

On the other hand, three race grooves 6 are provided in a tulip portion 5a formed at one end of a second shaft 5 in parallel with the axial line of said second shaft 5. Said race grooves 6 are coupled onto said rollers 4, so that a torque can be transmitted between the first shaft 1 and the second shaft 5 through said rollers 4.

Further, formed in the central portion of a trunnion portion 3a of said tripod shaft 3 is a mounting hole 7, in which are provided a compression spring 8 and a mushroom-shaped member 9, which is urged at its head 9a against the wall surface being of substantially spherical shape in cross-section of an open mouth-shaped recess 5b formed in the tulip portion 5a of the second shaft 5 by a biasing force of said compression spring 8.

Furthermore, a tripod spring 10 is mounted on one end of said second shaft 5, and the central portion of said tripod spring 10 is brought into pressing contact with a spherical portion 3b formed on the trunnion portion 3a of the tripod shaft 3, so that said tripod shaft 3 and the second shaft 5 can be connected to each other with no looseness in the axial direction of said second shaft 5.

Further, a boot 11 is provided for covering from outside a connecting portion between both shafts 1 and 5 over a range from the opening portion of the outer shell member 2 of said first shaft 1 to the intermediate portion of the second shaft 5 through bands 12 and 13 provided at opposite ends of said boot 11, respectively. With grease or oil being poured into a space formed around said connecting portion, said boot 11 can prevent dust from entering said connecting portion from outside and can maintain said connecting portion in well lubricated condition.

To transmit a torque when the first shaft 1 and the second shaft 5 are crossed with each other in the abovedescribed tripod type constant velocity universal joint, such a procedure is to be followed that, while the connection between the first shaft 1, tripod shafts 3 and second shaft 5 is maintained, the rollers 4 are rotated about axes of the tripod shafts 3, moved in the axial directions of the tripod shafts 3, and moved in the longitudinal directions of the race grooves 6 of the second shaft 5, during which the torque is transmitted between the shafts 1 and 5, whereby momentary rotary centers of the first shaft 1 and the second shaft 5 are progressively displaced, so that rotary angular velocities of the shafts 1 and 5 can be made equal to each other.

At this time of torque transmission, the central portion of the tripod spring 10 is brought into relatively slidable contact with the spherical portion 3b of the trunnion portion 3a of the tripod shaft 3. However, when a joint angle of the tripod type constant velocity universal joint is increased as shown in FIG. 2, the value of sliding of the second shaft 5 in the axial direction is increased due to a frictional force caused by sliding between the rollers 4 and the tripod shafts 3 as indicated by an arrow in FIG. 2, whereby a thrust force applied to the compression spring 8 due to the sliding of the second shaft 5 in the axial direction is increased.

Then, if said thrust force becomes larger in value than a preset load of the compression spring 8, the tripod spring 10 and the spherical portion 3b of the tripod shafts 3 are momentarily separated from each other, and vibrations and noises take place when said tripod spring 10 and said spherical portion 3b abut against each other again.

Now, to make the tripod spring 10 and the spherical portion 3b of the tripod shafts 3 to not easily be separated from each other, the preset load of the compression spring 8 should be increased (See FIG. 5), and, to increase said preset load, a spring constant of the compression spring 8 should be increased. However, in such a case, the tripod spring 10 and the spherical portion 3b repeatedly slide with both parts being always urged against each other under a large magnitude of force, thus resulting in increased wear of the tripod spring 10.

Consequently, in the conventional tripod type constant velocity universal joint, the vibrations and noises which take place between the tripod spring 10 and the spherical portion 3b of the tripod shaft 3 have not effectively been prevented when the joint angle is large.

SUMMARY OF THE INVENTION

As the result of earnest studies devoted to obviate the disadvantages of the prior art as described above, the present invention is thus based on the fact that the spring load of the connecting portion of the joint should be increased only when the joint angle is increased, so that the disadvantages as described above can be obviated. The object of the present invention is to provide a tripod type constant velocity universal joint, wherein, even when the joint angle of said tripod type constant velocity universal joint is large, neither vibrations nor noises due to strikings occur, and moreover, the tripod spring can be prevented from being worn.

To achieve the abovedescribed object, the tripod type constant velocity universal joint according to the present invention has such a characteristic feature that the external configuration of the mushroom-shaped member provided in the mounting hole of the trunnion portion of the tripod shafts is designed such that said external configuration has increased distance from the center of the joint as it leaves the center toward the outer periphery.

In addition, the abovedescribed and other characteristic features and advantages will hereinafter be made evident in conjunction with the description of the presently preferred embodiment of the invention illustrated in the accompanying drawings.

DETAILED DESCRIPTION OF THE PREFERRED EMBODIMENT

Figure 1:
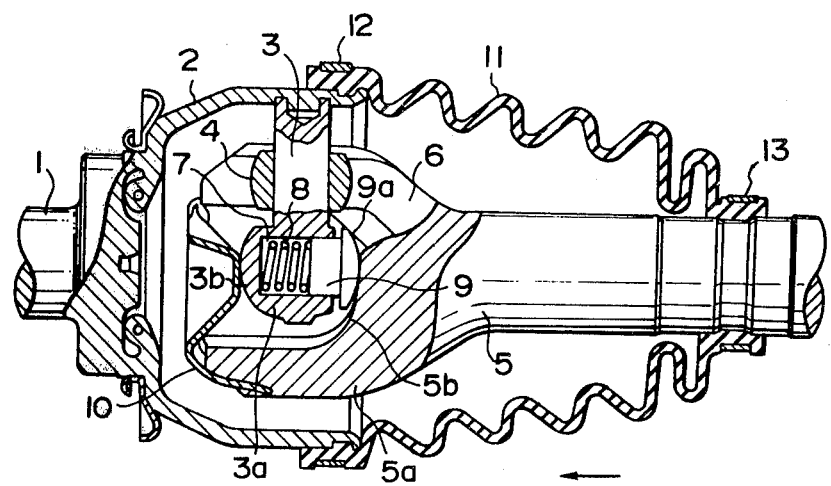
FIG. 1 is a sectional view showing one example of the tripod type constant velocity universal joint according to the present invention.
Figure 2:
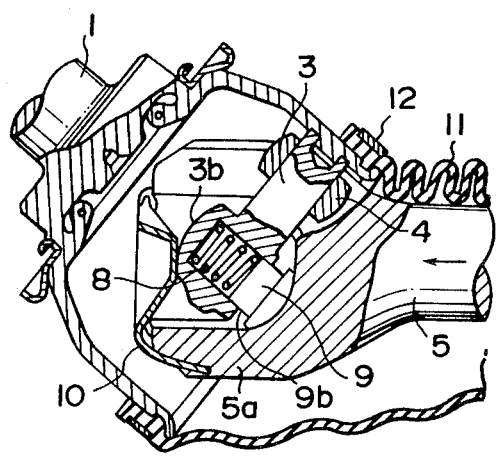
FIG. 2 is a sectional view showing the state where the joint angle is large.
Figure 3:
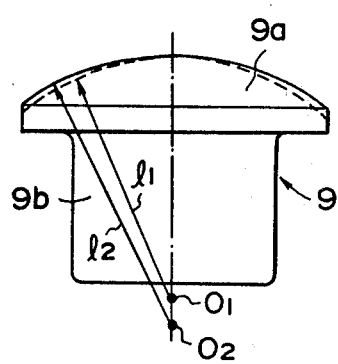
FIG. 3 is an enlarged view showing an embodiment of the mushroom-shaped member for use in the present invention as compared with the prior art.

Referring to the drawings, FIG. 3 shows an embodiment of the mushroom-shaped member for use in the tripod type constant velocity universal joint according to the present invention. Broken lines in FIG. 3 show the configuration of the head of the conventional mushroom-shaped member, while solid lines show the configuration of the head of the mushroom-shaped member for use in the present invention.

As apparent from FIG. 3, the external configuration of the forward end of the head 9a of the conventional mushroom-shaped member 9 is constructed to be a spherical surface having a radius $l_1$ from a point $O_1$ corresponding to the center of the joint on the center line in the axial direction of said mushroom-shaped member 9. As against this, the external configuration of the forward end of the head 9a of the mushroom-shaped member 9 according to the present invention is constructed such that said external configuration has larger distance from the point $O_1$ corresponding to the center of said joint as it leaves from the center toward the outer peripheral portion.

More specifically, the distance from the point $O_1$ corresponding to the center of the joint to the center of the head 9a of the mushroom-shaped member 9 is $l_1$ similarly to the conventional example indicated by the broken lines, however, said distance is increased as the external configuration leaves from the center toward the outer peripheral portion, and the forward end surface of the head 9a is, as shown in FIG. 3, constructed to be a spherical surface having a radius $l_2$ ($l_2 > l_1$) from a point $O_2$ which is offset downwardly from the point $O_1$ corresponding to the center of the joint on the center line of the mushroom-shaped member 9. This fact indicates that the radius of curvature of the outer surface of the head 9a is increased as it leaves from the position on the center line in the axial direction of the mushroom-shaped member 9 toward the outer peripheral portion.

It is found from the experiments conducted by the present inventor that it is desirable to increase the radius of curvature from the center of the outer periphery at a rate of about 10%.

Figure 4:
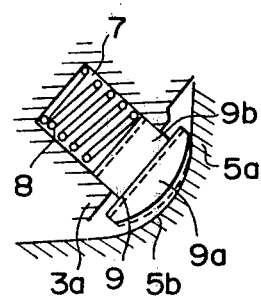
FIG. 4 is a partial, sectional view showing the state of the mushroom-shaped member when the joint angle is large.

As the result of the external configuration of the forward end of the head 9a of the mushroom-shaped member 9 being constructed as in the aforesaid embodiment, when the joint angle is large said mushroom-shaped member 9 abuts at its outer portion on the outer surface of the forward end of the head 9a, which is farthest from the center of the joint as indicated by solid lines in FIG. 4, against the spherically curved wall surface of the recess 5b in the tulip portion 5a.

Consequently, in such a case as above, as compared with the prior art in which the central portion of the forward end of the head 9a abuts against the wall surface of the recess 5b as described above (See broken lines in FIG. 4), the mushroom-shaped member 9 is more deeply pushed into the mounting hole 7, as indicated by solid lines in FIG. 4, than in the prior art. As a result, differing from the prior art in which the spring load of the compression spring 8 is constant irrespective of the joint angle, according to the present invention the spring load applied to the compression spring 8 from the mushroom-shaped member 9 becomes higher than the thrust load from the second shaft 5, and is further increased in accordance with the value of the joint angle. Consequently, if the value of offset of the point $O_2$ from the point $O_1$, the spring constant of the compression spring 8 and the like are preset in such a manner that said spring load becomes higher than the thrust load from the second shaft 5, then the tripod spring 10 and the spherical portion 3b of the trunnion portion 3a will not be separated to cause vibrations and striking noises.

On the other hand, when the joint angle is small, the thrust load of the second shaft 5 is small, and the spring load of the compression spring 8 becomes relatively larger than the thrust load, so that the tripod spring 10 and the trunnion portion 3a can be effectively prevented from being separated from each other. Moreover, the spring load is adapted to be large only when the joint angle is large as described above, so that the problem of wear of the tripod spring 10 can be obviated.

As has been described so far, in the present embodiment, not only when the joint angle is small, but also, particularly, when the joint angle is large, very advantageous effects can be obtained.

Figure 5:
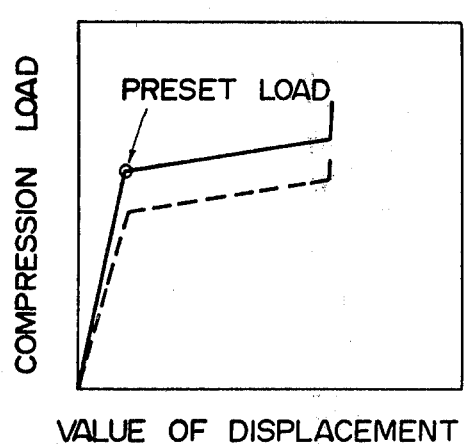
FIG. 5 is a chart showing the relationship between the value of displacement of the shaft and the compression load.

FIG. 5 shows the relationship of displacement of the shaft due to sliding in the axial direction, when the joint angle is large, in comparison between the present embodiment and an example of the prior art, with solid lines representing the present embodiment and broken lines the example of the prior art. As apparent from FIG. 5, in the present embodiment, the preset load point, i.e., the point, where the tripod spring 10 and the spherical portion 3b of the trunnion portion 3a are separated from each other, is higher than that in the prior art, so that very excellent effects of preventing vibrations and noises can be obtained.

Figure 6:
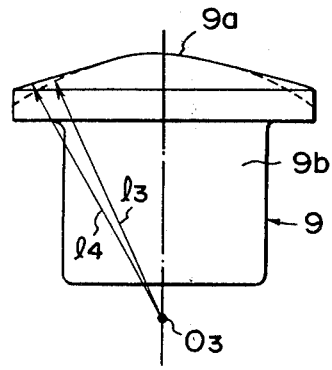
FIG. 6 is an enlarged view showing another embodiment of the mushroom-shaped member for use in the present invention.

FIG. 6 shows another embodiment of the mushroom-shaped member for use in the present invention. In this embodiment, the external configuration of the forward end of the head 9a of the mushroom-shaped member 9 is formed such that, as about the center line of the mushroom-shaped member 9 in the axial direction, said external configuration is formed into a spherical surface having a radius $l_3$ centered on a point $O_3$ corresponding to the center of the joint, while at a portion outwardly thereof, said external configuration is formed into a straightline shape constituting a tangent to said spherical portion. A distance $l_4$ from the point $O_3$ to a conical surface constituted by said straight line is larger than $l_3$, and further, said distance $l_4$ becomes larger as the point on said external configuration leaves toward the outer peripheral portion of the mushroom-shaped member 9 in the axial direction. In this embodiment also, the satisfactory effect of preventing vibrations and noises can be obtained as in the preceding embodiment.

Figure 7:
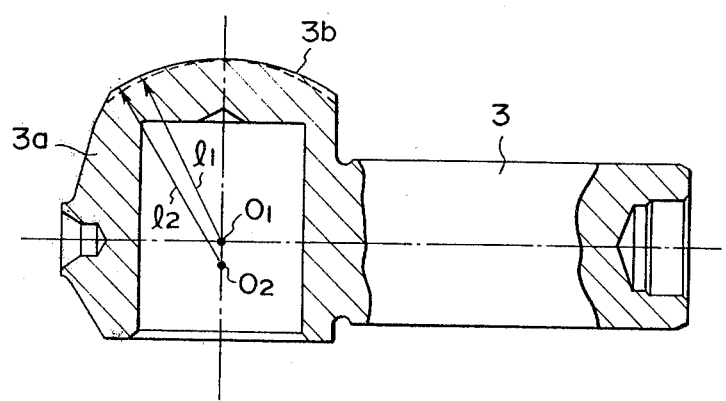
FIG. 7 is an enlarged view showing an embodiment of the tripod shaft for use in the present invention.

FIG. 7 shows an embodiment of the tripod shaft for use in the present invention. Broken lines in FIG. 7 show the configuration of the conventional tripod shaft, while solid lines show the configuration of the tripod shaft for use in the present invention. The external configuration of the conventional spherical portion $3b$ formed on the trunnion portion $3a$ of the tripod shaft 3 is constructed to be a spherical surface having a radius $l_1$ from a point $O_1$ corresponding to the center of the joint on the center line in the axial direction of said trunnion portion $3a$, which is coincided with the axial direction of said mushroom-shaped member 9. As against this, the external configuration of spherical portion $3b$ formed on the trunnion portion $3a$ of the tripod shaft 3 according to the present invention is constructed such that said external configuration has larger distance from the point $O_1$ corresponding to the center of said joint as it leaves from the center toward the outer peripheral portion.

More specifically, the distance from the point $O_1$ corresponding to the center of the joint to the center of the spherical portion $3b$ of the trunnion portion $3a$ is $l_1$ similarly to the conventional example indicated by the broken lines; however, said distance is increased as the external configuration leaves from the center toward the outer peripheral portion, and the external surface of the spherical portion $3b$ is, as shown in FIG. 7, constructed to be a spherical surface having a radius $l_2 (l_2 > l_1)$ from a point $O_2$ which is offset downwardly from the point $O_1$ corresponding to the center of the joint on the center line of the trunnion portion $3b$. This fact indicates that the radius of curvature of the outer surface of the spherical portion $3b$ is increased as it leaves from the position on the center line in the axial direction of the trunnion portion $3a$, toward the outer peripheral portion.

It is found from the experiments conducted by the present inventor that it is desirable to increase the radius of curvature from the center of the outer periphery at a rate of about 10%.

In this embodiment, the tripod spring 10 is biased by urging force from the spherical portion $3b$ of the trunnion portion $3a$, and the tripod spring 10 and the spherical portion $3b$ are not separated to cause vibrations and striking noises and the wear of the tripod spring 10 can be obviated.

Further, in this embodiment, as similar to the embodiment shown in FIG. 6, the external configuration of the spherical portion $3b$ of the trunnion portion $3a$ is formed such that, at about the center line of the trunnion portion $3a$ in the axial direction, said external configuration is formed into a spherical surface having a radius centered on a point corresponding to the center of the joint. At a portion outwardly thereof, said external configuration is formed into a straightline shape constituting a tangent to said spherical surface. A distance from the point to a conical surface constituted by said straight line is larger than said radius, and further, said distance becomes larger as the point on said external configuration leaves toward the outer peripheral portion of the spherical portion $3b$ in the axial direction. In this embodiment also, the satisfactory effect of preventing vibrations and noises can be obtained as in the preceding embodiment.

As has been described so far, according to the present invention, the spring load of the compression spring is increased only when the joint angle of the tripod type constant velocity universal joint is large, so that the tripod spring and the spherical surface of the trunnion portion of the tripod shaft can be prevented from being separated from each other. Consequently, vibrations and noises can be prevented from occurring, and moreover, the spring constant of the compression spring may be equal to the conventional case, thereby enabling control of the wear of the tripod spring.

What is claimed is:

1. A tripod type constant velocity universal joint, wherein a trunnion portion of tripod shafts fixed on a first shaft are urged against and supported by a tulip portion of a second shaft through a tripod spring, a mushroom-shaped member with a spherical head is provided in a mounting hole of said trunnion portion, said mushroom-shaped member is biased by a compression spring to keep the spherical head of said mushroom-shaped member in contact with a recess of said tulip portion, and the external configuration of the head of the mushroom-shaped member is formed in a manner that the distance from the center of the joint is increased as the point on the external configuration leaves from the center of the surface of said head toward the outer periphery of the head of the mushroom-shaped member.

2. A tripod type constant velocity universal joint as set forth in claim 1, wherein the external configuration of the head of said mushroom-shaped member is formed to provide a spherically curved surface in which, as a point on said external configuration leaves from the center of the surface of said head the mushroom-shaped member toward the outer periphery, the radius of curvature is increased.

3. A tripod type constant velocity universal joint as set forth in claim 2, wherein the radius of curvature of the outer surface of the head of said mushroom-shaped member is increased at a rate of about 10% over a range from the center line of said mushroom-shaped member in the axial direction to an outermost position.

4. A tripod type constant velocity universal joint as set forth in claim 1, wherein the external configuration of the head of said mushroom-shaped member is formed to provide a spherical surface having a predetermined radius of curvature from a point corresponding to the center of the joint, at about the center of the surface of said head of said mushroom-shaped member, and formed to provide a conical surface constituted by a straight line tangent to said spherical surface, in which the distance from a point corresponding to the center of the joint is increased as the point on the external configuration leaves the center toward the outer periphery, at a portion outwardly of said spherical surface.

5. A tripod type constant velocity universal joint, wherein a trunnion portion of tripod shafts fixed on a first shaft are urged against and supported by a tulip portion of a second shaft through a tripod spring pressing against a spherical portion of said trunnion portion, a mushroom-shaped member with a spherical head is provided in a mounting hole of said trunnion portion, said mushroom-shaped member is biased by a compression spring to keep the spherical head of said mushroom-shaped member in contact with a recess of said tulip portion, and the external configuration of the spherical portion of said trunnion portion is formed in a manner that the distance from the center of the joint is increased as the point on the external configuration leaves from the center of the surface of said head toward the outer periphery.

6. A tripod type constant velocity universal joint as set forth in claim 5, wherein the external configuration of the spherical portion of said trunnion portion is formed to provide a spherically curved surface in which, as a point on said external configuration leaves from the center of the surface of said spherical portion of said trunnion portion toward the outer periphery, the radius of curvature is increased.

7. A tripod type constant velocity universal joint as set forth in claim 5, wherein the radius of curvature of the outer surface of the spherical portion of said trunnion portion is increased at a rate of about 10% over a range from the center of the surface of said spherical portion of said trunnion portion to an outermost position.

8. A tripod type constant velocity universal joint as set forth in claim 5, wherein the external configuration of the spherical portion of said trunnion portion is formed to provide a spherical surface having a predetermined radius of curvature from a point corresponding to the center of joint, at about the axis of said trunnion portion, and formed to provide a conical surface constituted by a straight line being tangent to said spherical surface, in which the distance from a point corresponding to the center of the joint is increased as the point on the external configuration leaves the center of the surface of said spherical portion of said trunnion portion toward the outer periphery, at a portion outwardly of said spherical surface.

* * * * *